US009300512B2

(12) United States Patent
Lee et al.

(10) Patent No.: US 9,300,512 B2
(45) Date of Patent: Mar. 29, 2016

(54) METHOD FOR TRANSMITTING CONTROL INFORMATION AND APPARATUS FOR THE SAME

(71) Applicant: LG ELECTRONICS INC., Seoul (KR)

(72) Inventors: Dae Won Lee, Anyang-si (KR); Yu Jin Noh, Anyang-si (KR); Byeong Woo Kang, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 14/227,993

(22) Filed: Mar. 27, 2014

(65) Prior Publication Data

US 2014/0286327 A1 Sep. 25, 2014

Related U.S. Application Data

(63) Continuation of application No. 13/520,769, filed as application No. PCT/KR2011/000860 on Feb. 9, 2011, now Pat. No. 8,718,173.

(60) Provisional application No. 61/375,299, filed on Aug. 20, 2010, provisional application No. 61/307,429, filed on Feb. 23, 2010, provisional application No. 61/303,684, filed on Feb. 12, 2010.

(51) Int. Cl.
*H04L 27/26* (2006.01)
*H04B 7/04* (2006.01)
*H04W 84/12* (2009.01)

(52) U.S. Cl.
CPC .......... *H04L 27/2626* (2013.01); *H04B 7/0452* (2013.01); *H04L 27/2647* (2013.01); *H04W 84/12* (2013.01)

(58) Field of Classification Search
CPC ............ H04L 27/2626; H04L 27/2647; H04B 7/0452; H04W 84/12
See application file for complete search history.

(56) References Cited

U.S. PATENT DOCUMENTS 7,907,958 B2 3/2011 Sampath et al.
8,077,802 B2 12/2011 Sandhu et al.
(Continued)

FOREIGN PATENT DOCUMENTS

CN 101194487 A 6/2008
EP 2 056 637 A2 5/2009
(Continued)

OTHER PUBLICATIONS

Tu et al., "Proposal for TGac VHT Format", IEEE 802.11-09/1258r0, Nov. 19, 2009, Slides 1-12.
(Continued)

*Primary Examiner* — Paul H Masur
(74) *Attorney, Agent, or Firm* — Birch, Stewart, Kolasch & Birch, LLP

(57) ABSTRACT

Methods and devices for transmitting or receiving data in a wireless local area network are provided. The method in one embodiment includes transmitting, by a transmitter, a first long training field (LTF) to a receiver; transmitting, by the transmitter, a very high throughput (VHT)-SIG-A field to the receiver; transmitting, by a transmitter, a second LTF for multiple input multiple output (MIMO) channel estimation to the receiver; transmitting, by the transmitter, a VHT-SIG-B field to the receiver; and transmitting, by the transmitter, a data field to the receiver, wherein the first LTF, the VHT-SIG-A field, the second LTF, the VHT-SIG-B field and the data field are sequentially transmitted, and wherein the second LTF and the data field are mapped to at least one spatial stream based on a mapping matrix but the first LTF and the VHT SIG-A field are not mapped to the at least one spatial stream.

12 Claims, 10 Drawing Sheets

(56) References Cited

U.S. PATENT DOCUMENTS

| | | |
|---|---|---|
| 8,437,440 B1 | 5/2013 | Zhang et al. |
| 2003/0123470 A1 | 7/2003 | Kim et al. |
| 2004/0064493 A1 | 4/2004 | Kulkarni et al. |
| 2005/0120097 A1 | 6/2005 | Walton et al. |
| 2005/0135284 A1 | 6/2005 | Nanda et al. |
| 2005/0135318 A1 | 6/2005 | Walton et al. |
| 2005/0190728 A1 | 9/2005 | Han et al. |
| 2005/0220058 A1 | 10/2005 | Garg |
| 2006/0002487 A1 | 1/2006 | Kriedte et al. |
| 2007/0097930 A1 | 5/2007 | Ouyang et al. |
| 2007/0104089 A1 | 5/2007 | Mujitaba |
| 2007/0223422 A1 | 9/2007 | Kim et al. |
| 2008/0080635 A1 | 4/2008 | Hugl et al. |
| 2008/0144733 A1 | 6/2008 | ElGamal et al. |
| 2008/0225964 A1 | 9/2008 | Han et al. |
| 2009/0031185 A1 | 1/2009 | Xhafa et al. |
| 2009/0041148 A1 | 2/2009 | Li et al. |
| 2009/0046768 A1 | 2/2009 | Pare, Jr. |
| 2009/0154427 A1 | 6/2009 | Lee et al. |
| 2009/0232062 A1 | 9/2009 | Higuchi et al. |
| 2009/0232229 A1 | 9/2009 | Sandhu et al. |
| 2009/0233556 A1 | 9/2009 | Xia et al. |
| 2009/0238297 A1 | 9/2009 | Zhang et al. |
| 2009/0245153 A1 | 10/2009 | Li et al. |
| 2009/0268837 A1 | 10/2009 | Kimura et al. |
| 2009/0291702 A1 | 11/2009 | Imai et al. |
| 2009/0322621 A1 | 12/2009 | Inanoglu et al. |
| 2009/0323849 A1 | 12/2009 | Bala et al. |
| 2010/0002800 A1 | 1/2010 | Kim et al. |
| 2010/0046455 A1 | 2/2010 | Wentink et al. |
| 2010/0046457 A1 | 2/2010 | Abraham et al. |
| 2010/0046542 A1 | 2/2010 | Van Zelst et al. |
| 2010/0054200 A1 | 3/2010 | Tsai |
| 2010/0075703 A1 | 3/2010 | Imai et al. |
| 2010/0248635 A1* | 9/2010 | Zhang et al. .................. 455/63.1 |
| 2010/0260159 A1* | 10/2010 | Zhang et al. .................. 370/338 |
| 2010/0284393 A1 | 11/2010 | Abraham et al. |
| 2010/0296591 A1 | 11/2010 | Xu et al. |
| 2010/0329195 A1 | 12/2010 | Abraham et al. |
| 2010/0329236 A1 | 12/2010 | Sampath et al. |
| 2011/0002227 A1 | 1/2011 | Sampath et al. |
| 2011/0018780 A1 | 1/2011 | Tassoudji et al. |
| 2011/0032875 A1 | 2/2011 | Erceg et al. |
| 2011/0096796 A1* | 4/2011 | Zhang et al. .................. 370/474 |
| 2011/0122971 A1 | 5/2011 | Kim et al. |
| 2011/0170627 A1* | 7/2011 | Kwon et al. .................. 375/295 |
| 2012/0269295 A9 | 10/2012 | Ko et al. |

FOREIGN PATENT DOCUMENTS

| | | |
|---|---|---|
| EP | 2 056 644 A2 | 5/2009 |
| JP | 2009-219117 A | 9/2009 |
| JP | 2012-504920 A | 2/2012 |
| JP | 2012-523774 A | 10/2012 |
| JP | 2013-502173 A | 1/2013 |
| KR | 10-2003-0014801 A | 2/2003 |
| KR | 10-2007-0084289 A1 | 8/2007 |
| KR | 10-2008-0025153 A | 3/2008 |
| RU | 2332802 C2 | 8/2008 |
| WO | WO 01/72080 A1 | 9/2001 |
| WO | WO 2006/132508 A1 | 12/2006 |
| WO | WO 2007/111266 A1 | 10/2007 |
| WO | WO 2008/002972 A2 | 1/2008 |
| WO | WO 2008/015543 A2 | 2/2008 |
| WO | WO 2008/032979 A1 | 3/2008 |
| WO | WO 2008/100093 A1 | 8/2008 |
| WO | WO 2010/042386 A2 | 4/2010 |
| WO | WO 2010/042386 A3 | 4/2010 |
| WO | WO 2010/120692 A1 | 10/2010 |
| WO | WO 2011/019968 A1 | 2/2011 |

OTHER PUBLICATIONS

Huawei, "Downlink Control Signaling for Dual-Layer Beamforming," 3GPP TSG RAN WG1, Meeting #58, Agenda Item 14, R1-093027, Aug. 24-28, 2009, Shenzhen, China, 4 pages.

Kim et al., "Bits Consideration for SIGNAL Fields," IEEE 802.11-10/0382r2, May 20, 2010, 21 pages.

Noh et al., "Preamble Design Aspects for MU-MIMO Support," IEEE P802.11-09/1161r0, Nov. 13, 2009, 20 pages.

Zhang et al., "802.11ac Preamble," IEEE 802.11-10/0070r0, Jan. 18, 2010, 11 pages.

Gross et al., "Multi-User OFDMA Frame Aggregation for Future Wireless Local Area Networking," In Proc. of IFIP Networking 2009, Aachen, Germany, May 2009, 12 pages.

Leonardo Lananta et al., "IEEE802.11ac Preamble with Legacy 802.11a/n Backward Compatibility", Jul. 14, 2009.

Richard Van Nee et al., "UL MU-MIMO for 11ac", IEEE 802.11-09/0852-00-00ac, Jul. 31, 2009.

Xiao et al., "IEEE 802.11N: Enhancements for Higher Throughput in Wireless LANs," IEEE Wireless Communications, Dec. 2005, 10 pages.

* cited by examiner

METHOD FOR TRANSMITTING CONTROL INFORMATION AND APPARATUS FOR THE SAME

CROSS-REFERENCE TO RELATED APPLICATIONS

This application is a continuation of U.S. patent application Ser. No. 13/520,769 filed on Jul. 5, 2012 (now U.S. Pat. No. 8,718,173), which is the National Stage of PCT/KR2011/000860 filed on Feb. 9, 2011, which claims the benefit of U.S. Provisional Application No. 61/303,684 filed on Feb. 12, 2010, U.S. Provisional Application No. 61/307,429 filed on Feb. 23, 2010 and U.S. Provisional Application No. 61/375,299 filed on Aug. 20, 2010, the entire contents of all of the above applications are hereby incorporated by reference.

BACKGROUND OF THE INVENTION

1. Field of the Invention

The present invention relates to wireless communications, and more particularly, to a method for transmitting control information with high reliability in a wireless local area network (WLAN) system and an apparatus supporting the method.

2. Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

An IEEE 802.11n HT WLAN system employs an HT green field physical layer convergence procedure (PLCP) protocol data unit (PPDU) format which is a PPDU format designed effectively for an HT station (STA) and which can be used in a system consisting of only HT STAs supporting IEEE 802.11n in addition to a PPDU format supporting a legacy STA. In addition, an HT-mixed PPDU format which is a PPDU format defined such that a system in which the legacy STA and the HT STA coexist can support an HT system.

With the widespread use of the WLAN and the diversification of applications using the WLAN, there is a recent demand for a new WLAN system to support a higher throughput in comparison with a data processing rate supported by the IEEE 802.11n. A very high throughput (VHT) WLAN system is a next version of the IEEE 802.11n WLAN system, and is one of IEEE 802.11 WLAN systems which have recently been proposed to support a data processing rate of above 1 Gbps in a medium access control (MAC) service access point (SAP).

The VHT WLAN system allows simultaneous channel access of a plurality of VHT STAs for the effective use of a radio channel. For this, a multi-user multiple input multiple output (MU-MIMO)-based transmission using multiple antennas is supported. The VHT AP can perform spatial division multiple access (SDMA) transmission for transmitting spatial-multiplexed data to the plurality of VHT STAs. When data is simultaneously transmitted by distributing a plurality of spatial streams to the plurality of STAs by using a plurality of antennas, an overall throughput of the WLAN system can be increased.

Since a PPDU transmitted by the VHT AP and/or the VHT STA is transmitted through a plurality of spatial streams by using beamforming, in order to acquire data by using the PPDU, control information for the PPDU is required by the VHT STA and/or the VHT AP for receiving the PPDU. The control information may be transmitted by being included in the transmitted PPDU. Although the control information is not significant in terms of size and number, the control information is relatively important since the control information is a basic element for interpreting the PPDU for data acquisition. Accordingly, there is a need for a method capable of transmitting the control information with high reliability.

SUMMARY OF THE INVENTION

The present invention provides a method for transmitting control information with high reliability in a wireless local area network (WLAN) system and an apparatus supporting the method.

In an aspect, a method for transmitting control information in a wireless communication system is provided. The method includes transmitting common control information including a multiple input multiple output (MIMO) indicator indicating single user-MIMO (SU-MIMO) or multi user-MIMO (MU-MIMO) to a receiver, generating first precoded dedicated control information by performing precoding on dedicated control information including information for the MU-MIMO by the use of a first precoding matrix, generating second precoded dedicated control information by performing precoding on the first precoded dedicated control information by the use of a second precoding matrix and transmitting the second precoded dedicated control information to the receiver.

The first precoding matrix may be defined according to the number of all spatial streams for the MU-MIMO.

The second precoding matrix may be defined according to the number of spatial streams allocated to the receiver.

The second precoding matrix may be selected from at least one column vector of a discrete Fourier transform (DFT) matrix $M_{DFT}$ expressed by $$M_{DFT} = \begin{bmatrix} 1 & 1 & \cdots & 1 \\ 1 & e^{-j\frac{2\pi}{N}1} & \cdots & e^{-j\frac{2\pi}{N}(N-1)} \\ \vdots & \vdots & e^{-j\frac{2\pi}{N}(n-1)(m-1)} & \vdots \\ 1 & e^{-j\frac{2\pi}{N}(N-1)} & \cdots & e^{-j\frac{2\pi}{N}(N-1)(N-1)} \end{bmatrix}$$

where N is the number of spatial streams to be transmitted to the receiver, n is a constant indicating a row, and m is a constant indicating a column.

The second precoding matrix may be determined alternately to the at least one column vector of the DFT matrix in each of at least one subcarrier used for transmission of the second precoded dedicated control information.

The second precoding matrix may be defined such that a phase shift is performed on each of at least one subcarrier used for transmission of the second precoded dedicated control information.

The method may further include scrambling the dedicated control information by using a scrambling code.

The scrambling code may be generated based on a unique identifier of the receiver.

The common control information may include sub-information indicating the number of spatial streams allocated to the receiver and the scrambling code may be determined based on a value indicated by an index allocated to the sub-information indicating the number of spatial streams.

The scrambling code may be a pseudo noise (PN) sequence.

In another aspect, a wireless apparatus is provided. The wireless apparatus includes a processor and a transceiver operationally coupled to the processor to transmit and receive a frame. The processor is configured for transmitting common control information including a multiple input multiple output (MIMO) indicator indicating single user-MIMO (SU-MIMO) or multi user-MIMO (MU-MIMO) to a receiver, generating first precoded dedicated control information by performing precoding on dedicated control information including information for the MU-MIMO by the use of a first precoding matrix, generating second precoded dedicated control information by performing precoding on the first precoded dedicated control information by the use of a second precoding matrix and transmitting the second precoded dedicated control information to the receiver.

According to the present invention, control information can be transmitted with high reliability by using a method for transmitting control information related to multi-user multiple input multiple output (MU-MIMO) transmission by the use of spatial diversity.

In addition, a bit sequence constituting the control information related to MU-MIMO transmission is randomized through scrambling to decrease interference between stations (STAs).

DETAILED DESCRIPTION OF THE INVENTION

A wireless local area network (WLAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the institute of electrical and electronics engineers (IEEE) 802.11 standard. The STA may be an AP or a non-AP STA. Hereinafter, the STA refers to the non-AP STA unless specified otherwise.

The STA can be classified into a very high throughput (VHT)-STA, a high throughput (HT)-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

Figure 1:
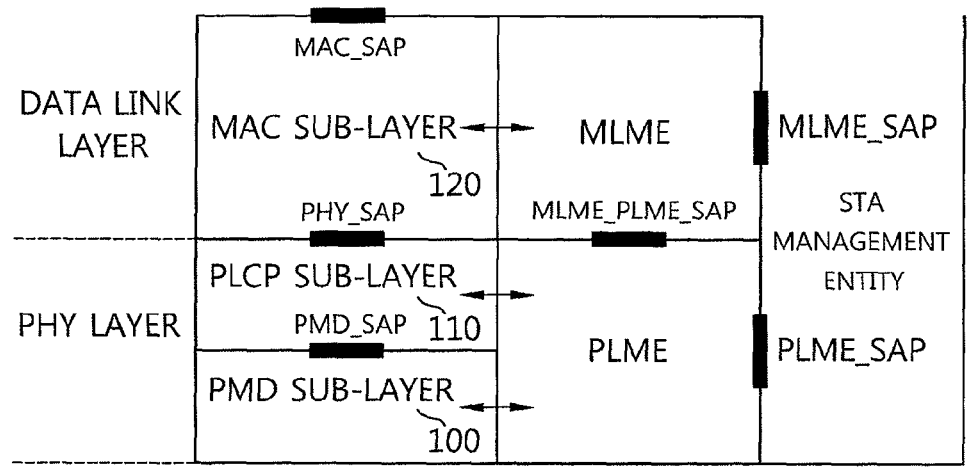
FIG. 1 shows a physical layer architecture of the institute of electrical and electronics engineers (IEEE) 802.11.

FIG. 1 shows an IEEE 802.11 physical layer (PHY) architecture.

The IEEE 802.11 PHY architecture includes a PHY layer management entity (PLME), a physical layer convergence procedure (PLCP) sub-layer 110, and a physical medium dependent (PMD) sub-layer 100. The PLME provides a PHY management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer, or delivers to the MAC sub-layer 120 a frame received from the PMD sub-layer 100. The PMD sub-layer 100 is a lower layer of the PDCP sub-layer and serves to enable transmission and reception of a PHY entity between two STAs through a radio medium. The MPDU delivered by the MAC sub-layer 120 is referred to as a physical service data unit (PSDU) in the PLCP sub-layer 110. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 110 attaches an additional field including information required by a PHY transceiver to the MPDU in a process of receiving the MPDU from the MAC sub-layer 120 and delivering a PSDU to the PMD sub-layer 100. The additional field attached in this case may be a PLCP preamble, a PLCP header, tail bits required on a data field, etc. The PLCP preamble serves to allow a receiver to prepare a synchronization function and antenna diversity before the PSDU is transmitted. The PLCP header includes a field that contains information on a PLCP protocol data unit (PDU) to be transmitted, which will be described below in greater detail with reference to FIG. 2.

The PLCP sub-layer 110 generates a PLCP protocol data unit (PPDU) by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data.

Figure 2:
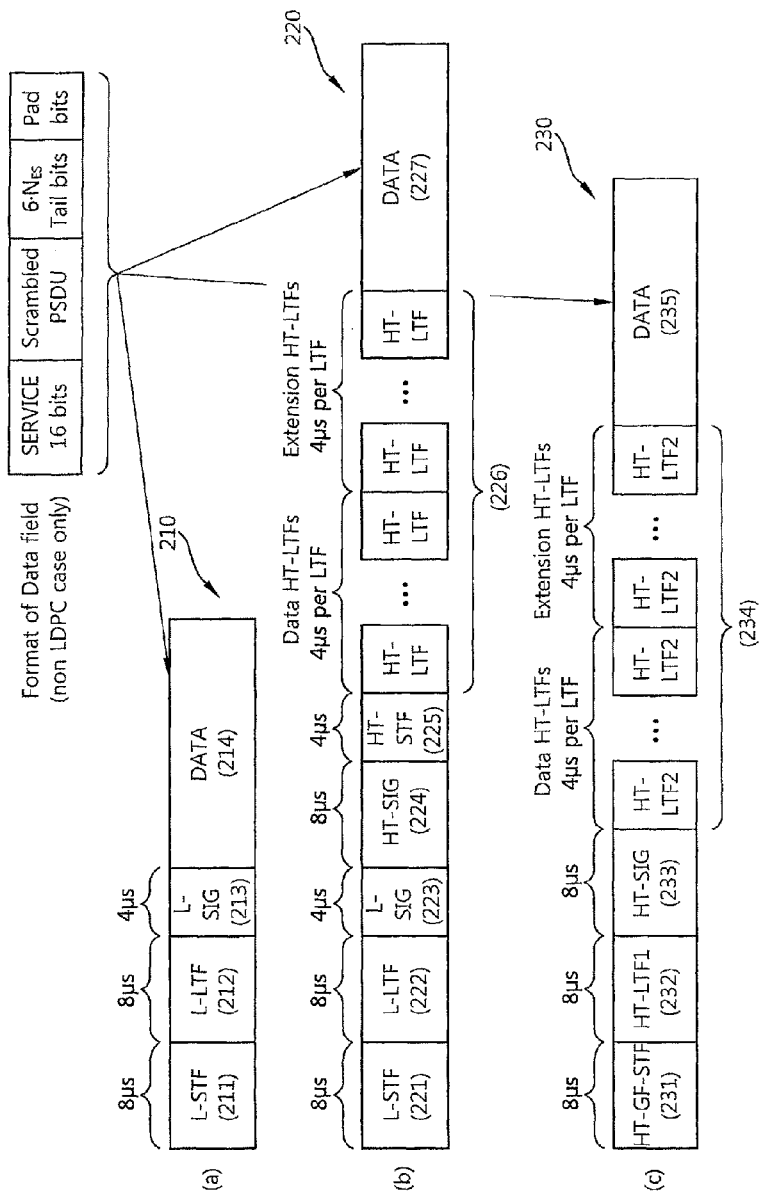
FIG. 2 is a diagram showing an example of a physical layer convergence procedure (PLCP) protocol data unit (PPDU) format used in a wireless local area network (WLAN) system based on the IEEE 802.11n standard.

FIG. 2 is a diagram showing an example of a PPDU format used in a WLAN system based on the IEEE 802.11n standard.

FIG. 2(a) shows a legacy PPDU (L-PPDU) format for a PPDU used in the existing IEEE 802.11a/b/g.

An L-PPDU 210 includes an L-STF field 211, an L-LTF field 212, an L-SIG field 213, and a data field 214.

The L-STF field 211 is used for frame timing acquisition, automatic gain control (AGC) convergence, coarse frequency acquisition, etc.

The L-LTF field 212 is used for frequency offset and channel estimation.

The L-SIG field 213 includes control information for demodulation and decoding of the data field 214.

The L-PPDU may be transmitted in the order of the L-STF field 211, the L-LTF field 212, the L-SIG field 213, and the data field 214.

FIG. 2(b) is a diagram showing an HT-mixed PPDU format in which an L-STA and an HT-STA can coexist. An HT-mixed PPDU 220 includes an L-STF field 221, an L-LTF field 222, an L-SIG field 223, an HT-SIG field 224, an HT-STF field 225, a plurality of HT-LTF fields 226, and a data field 227.

The L-STF field 221, the L-LTF field 222, and the L-SIG field 223 are identical to those shown in FIG. 2(a). Therefore, the L-STA can interpret the data field by using the L-STF field 221, the L-LTF field 222, and the L-SIG field 223 even if the HT-mixed PPDU 220 is received. The L-LTF field 222 may further include information for channel estimation to be performed by the HT-STA in order to receive the HT-mixed PPDU 220 and to interpret the L-SIG field 223, the HT-SIG field 224, and the HT-STF field 225.

The HT-STA can know that the HT-mixed PPDU 220 is a PPDU dedicated to the HT-STA by using the HT-SIG field 224 located next to the L-SIG field 223, and thus can demodulate and decode the data field 227.

The HT-STF field 225 may be used for frame timing synchronization, AGC convergence, etc., for the HT-STA.

The HT-LTF field 226 may be used for channel estimation for demodulation of the data field 227. Since the IEEE 802.11n supports single user-MIMO (SU-MIMO), a plurality of the HT-LTF fields 226 may be configured for channel estimation for each of data fields transmitted through a plurality of spatial streams.

The HT-LTF field 226 may consist of a data HT-LTF used for channel estimation for a spatial stream and an extension HT-LTF additionally used for full channel sounding. Therefore, the number of the plurality of HT-LTF fields 226 may be equal to or greater than the number of spatial streams to be transmitted.

The L-STF field 221, the L-LTF field 222, and the L-SIG field 223 are transmitted first so that the L-STA also can acquire data by receiving the HT-mixed PPDU 220. Thereafter, the HT-SIG field 224 is transmitted for demodulation and decoding of data transmitted for the FIT-STA.

Up to fields located before the HT-SIG field 224, transmission is performed without beamforming so that the L-STA and the HT-STA can acquire data by receiving a corresponding PPDU. In the subsequently fields, i.e., the HT-STF field 225, the HT-LTF 226, and the data field 227, radio signal transmission is performed by using precoding. In this case, the HT-STF field 225 is transmitted so that an STA that receives a precoded signal can consider a varying part caused by the precoding, and thereafter the plurality of HT-LTF fields 226 and the data field 227 are transmitted.

Even if an HT-STA that uses 20 MHz in an HT WLAN system uses 52 data subcarriers per OFDM symbol, an L-STA that also uses 20 MHz uses 48 data subcarriers per OFDM symbol. Since the HT-SIG field 224 is decoded by using the L-LTF field 222 in a format of the HT-mixed PPDU 220 to support backward compatibility, the HT-SIG field 224 consists of 482 data subcarriers. The HT-SIT field 225 and the HT-LTF 226 consist of 52 data subcarriers per OFDM symbol. As a result, the HT-SIG field 224 is supported using ½ binary phase shift keying (BPSK), each HT-SIG field 224 consists of 24 bits, and thus 48 bits are transmitted in total. That is, channel estimation for the L-SIG field 223 and the HT-SIG field 224 is performed using the L-LTF field 222, and a bit sequence constituting the L-LTF field 222 can be expressed by Equation 1 below. The L-LTF field 222 consists of 48 data subcarriers per one symbol, except for a DC subcarrier.

$$L_{-26,26} = \{1,1,-1,-1,1,1,-1,1,-1,1,1,1,1,1,1,-1,-1,1,\\ 1,-1,1,-1,1,1,1,1,0,1,-1,-1,1,1,-1,1,-1,1,-\\ 1,-1,-1,-1,1,1,-1,-1,1,1,-1,1,1,1,1\} \quad \text{[Equation 1]}$$

FIG. 2(c) is a diagram showing a format of an HT-Greenfield PPDU 230 that can be used by only an HT-STA. The HT-GF PPDU 230 includes an HT-GF-STF field 231, an HT-LTF1 field 232, an HT-SIG field 233, a plurality of HT-LTF2 fields 234, and a data field 235.

The HT-GF-STF field 231 is used for frame timing acquisition and AGC.

The HT-LTF1 field 232 is used for channel estimation.

The HT-SIG field 233 is used for demodulation and decoding of the data field 235.

The HT-LTF2 234 is used for channel estimation for demodulation of the data field 235. Since the HT-STA uses SU-MIMO, channel estimation is required for each of data fields transmitted through a plurality of spatial streams, and thus a plurality of HT-LTF2 fields 234 may be configured.

The plurality of HT-LTF2 fields 234 may consist of a plurality of data HT-LTFs and a plurality of extension HT-LTFs, similarly to the HT-LTF 226 of the HT-mixed PPDU 220.

Each of the data fields 214, 227, and 235 respectively shown in FIGS. 2(a), (b), and (c) may include a service field, a scrambled PSDU field, a tail bits field, and a padding bits field.

Unlike the IEEE 802.11n standard supporting the HT, the IEEE 802.11ac requires a higher throughput. It is called a very high throughput (VHT) to be distinguished from the HT, and 80 MHz bandwidth transmission and/or higher bandwidth transmission (e.g., 160 MHz) are supported in the IEEE 802.11 ac. In addition, multi user-MIMO (MU-MIMO) is supported.

An amount of control information transmitted to STAs for MU-MIMO transmission may be relatively greater than an amount of IEEE 802.11n control information. For example, control information additionally required for the VHT WLAN system may be information indicating the number of spatial streams that must be received by each STA, information regarding modulation and coding of data transmitted for each STA, etc. Therefore, when MU-MIMO transmission is performed to provide data simultaneously to a plurality of STAs, the control information to be transmitted may increase in amount according to the number of reception STAs.

In order to effectively transmit the increased amount of control information to be transmitted, among a plurality of pieces of control information required for MU-MIMO transmission, control information required commonly for all STAs and control information required individually for the STAs may be transmitted by distinguishing the two types of control information. Hereinafter, this will be described in greater detail by reference to a PPDU format in a WLAN system supporting the IEEE 802.11 ac. An STA implies a VHT-STA in the following description.

Figure 3:
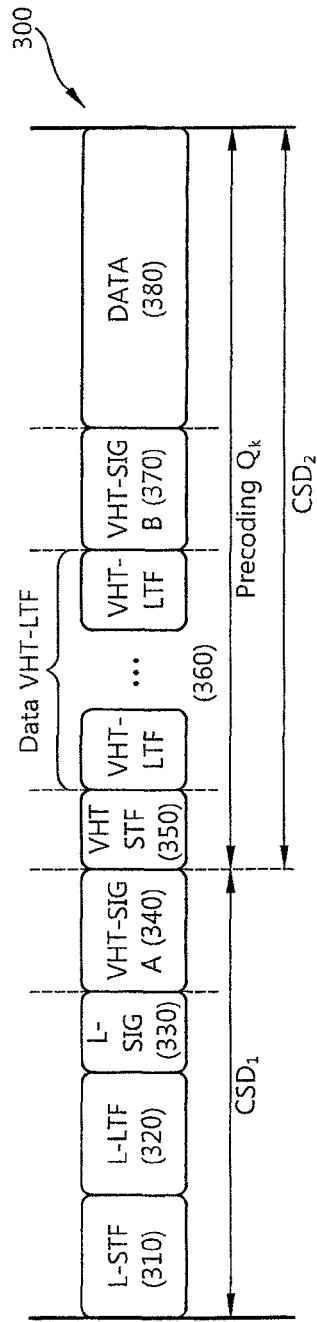
FIG. 3 is a diagram showing an example of a PPDU format that can be used in a very high throughput (VHT) WLAN system.

FIG. 3 is a diagram showing an example of a PPDU format that can be used in a VHT WLAN system.

Referring to FIG. 3, a PPDU 300 includes an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sub-layer converts a PSDU delivered from a MAC layer into a data field by attaching required information to the PSDU, generates the PPDU 300 by attaching various fields such as the L-STF field 310, the L-LTF field 320, the L-SIG field 330, the VHT-SIGA field 340, the VHT-STF field 350, the VHT-LTF field 360, the VHT-SIGB field 370, etc., and transmits the PPDU 300 to one or more STAs through a PMD layer.

The L-STF field 310 is used for frame timing acquisition, AGC convergence, coarse frequency acquisition, etc.

The L-LTF field 320 is used for channel estimation for demodulation of the L-SIG field 330 and the VHT-SIGA field 340.

The L-SIG field 330 is used when the L-STA receives the PPDU to acquire data.

The VHT-SIGA field 340 is common control information required for VHT-STAs which are MU-MIMO paired with an AP, and includes control information required to interpret the received PPDU 300. The VHT-SIGA field 340 includes information for a spatial stream for each STA, bandwidth information, identification information for indicating whether space time block coding (STBC) is used, a group identifier (i.e., identification information for an STA group), information on an STA to which each group identifier is allocated, and information related to a short guard interval (GI). Herein, the group identifier may include whether a currently used MIMO transmission scheme is MU-MIMO or SU-MIMO.

The VHT-STF field 350 is used to improve performance of AGC estimation in MIMO transmission.

The VHT-LTF field 360 is used when an STA estimates a MIMO channel. Since a VHT WLAN system supports MU-MIMO, the VHT-LTF field 360 can be configured by the number of spatial streams through which the PPDU 300 is transmitted. In addition, when full channel coding is supported and is performed, the number of VHT LTFs may increase.

The VHT-SIGB field 370 includes dedicated control information required when the MU-MIMO paired STA receives the PPDU 300 to acquire data. Therefore, the STA may be designed such that the VHT-SIGB field 370 is decoded only when the common control information included in the VHT-SIGB field 370 indicates that a currently received PPDU is transmitted using MU-MIMO transmission. On the contrary, the STA may be designed such that the VHT-SIGB field 370 is not decoded when the common control information indicates that the currently received PPDU is for a single STA (including SU-MIMO).

The VHT-SIGB field 370 includes information on each STA's modulation, encoding, and rate-matching. The VHT-SIGB field 370 may have a different size according to a MIMO transmission type (i.e., MU-MIMO or SU-MIMO) and a channel bandwidth used for PPDU transmission.

The VHT WLAN system employs the VHT-SIGA field 340 including common control information commonly applied to a plurality of STAs and the VHT-SIGB field 370 including dedicated control information individually applied to the respective STAS as described above for the effective support of MU-MIMO. Since the VHT-SIGA field 340 is allocated 48 data subcarriers per OFDM symbol similarly to the L-STF field 310, the L-LTF field 320, and the L-SIG field 330 for backward compatibility, the L-LTF field 320 is used for channel estimation. However, the VHT-STF field 350 and the VHT-LTF field 360 are transmitted after transmission of the VHT-SIGA field 340, and for this, 52 data subcarriers are used per OFDM symbol. Likewise, since the VHT-SIGB field 370 is transmitted using 52 data subcarriers, channel estimation of the VHT-SIGB field 370 is performed by using the VHT-LTF field 360. If it is assumed that the VHT-LTF field 360 and the HT-LTF field 226 of FIG. 2(b) use the same bit sequence, it can be expressed by Equation 2 below, and the bit sequence consists of 52 data subcarriers per one symbol except for a DC subcarrier.

$$VHTLTF_{-28,28} = \{1,1,1,1,-1,-1,1,1,-1,1,-1,1,1,1,1,1,\\ 1,-1,-1,1,1,-1,1,-1,1,1,1,1,1,0,1,-1,-1,1,1,-1,1,-\\ 1,1,-1,-,-1,-1,-1,1,1,-1,-1,1,-1,1,1,-1,1,1,1,1,1,-\\ 1,-1\} \quad [\text{Equation 2}]$$

Since Equation 1 and Equation 2 above are different from each other, if the VHT-SIGA field 340 is transmitted using ½ (rotated) BPSK, the field has a size of 48 bits, and if the VHT-SIGB field 370 is transmitted using ½ (rotated) BPSK, the VHT-SIGB field 370 has a size of 26 bits.

The L-LTF field 320, consisting of 48 data subcarriers (i.e., subcarriers indexed with −26 to −1 and 1 to 26, where 4 subcarriers correspond to pilots) per symbol, may be used for channel estimation of VHT-SIGA field 340, and the VHT-LTF field 360 consisting of 52 data subcarriers (i.e., subcarriers indexed with −28 to −1 and 1 to 28, where 4 subcarriers correspond to pilots) per symbol may be used for channel estimation of VHT-SIGB field 370. A diagram of FIG. 4 for showing a PPDU format transmitted or received in a VHT WLAN system may be used herein by reference.

Figure 4:
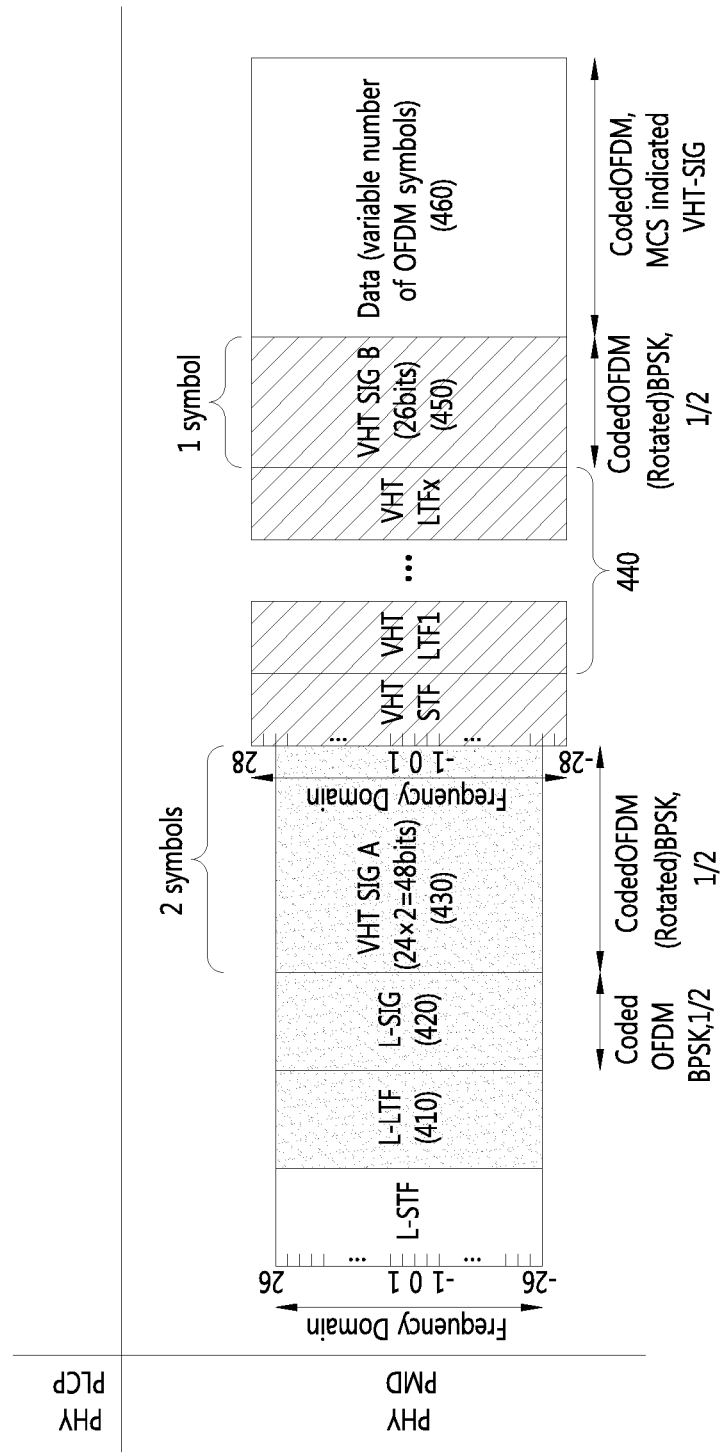
FIG. 4 is a diagram showing a PPDU format in a VHT WLAN system.

Referring to FIG. 4, channel estimation is performed based on an L-LTF field 410 when an STA receives an L-SIG field 420 and a VHT-SIGA field 430 which are indicated by a dotted shaded area. The VHT-SIGA field 430 is allocated to two symbols, and has a size of 48 bits.

On the other hand, when the STA receives a VHT-SIGB field 450 indicated by a slash shadow area, channel estimation is performed based on a VHT-LTF field 440 (i.e. VHT LTF1, VHT-LTF2, . . . , VHT-LTFx). The VHT-SIGB field 450 is allocated to one symbol, and has a size of 26 bits.

When transmitting a data field 460, a modulation and coding scheme (MCS) may be optionally included in the VHT-SIGA field 430 and/or the VHT-SIGB field 450. In addition, the L-LTF for the VHT-SIGA field is transmitted omni-directionally, and the VHT-LTF 440 for the VHT-SIGB field 450 is transmitted by performing beamforming based on a precoding matrix.

52 data subcarriers per symbol is an exemplary case where a parameter used in an HT WLAN system is directly used in a VHT WLAN system. If the VHT WLAN system is newly designed, the number of data subcarriers per symbol may be greater than 52, and a new VHT-LTF may be defined. That is, if more than 48 data subcarriers can be transmitted per symbol, the VHT-SIGB field greater than 24 bits may be transmitted and thus the VHT-SIGB field and the VHT-SIGA field may use different LTF bit sequences for channel estimation.

Referring back to FIG. 3, the VHT-SIGA field 340 uses a cyclic shifting delay (CSD) in a transmission (Tx) antenna domain (or time domain) so that it can be received by all STAs that are paired in MU-MIMO transmission. On the other hand, since the VHT-SIGB field 370 includes dedicated control information that must be received by a specific STA for receiving the data field 380, the VHT-SIGB field 370 may be transmitted by performing beamforming based on a precoding matrix unlike the VHT-SIGA field 340.

When the data field 380 is transmitted through a plurality of spatial streams, the VHT-SIGB field 370 is also transmitted by performing beamforming by the use of the same precoding matrix as that used in the data field 380. Unlike data containing information that can be transmitted through the plurality of spatial streams, a fixed amount of control information may be included in the VHT-SIGB field 370. Therefore, the VHT-SIGB field 370 may be preferably transmitted through one spatial stream instead of being transmitted through a spatial stream by performing beamforming based on the precoding matrix.

If the VHT-SIGB field 370 is transmitted through one spatial stream among the plurality of spatial streams through which the data field 380 is transmitted, a specific spatial stream through which the VHT-SIGB field 370 is transmitted must be pre-agreed between a transmitting end and a receiving end. This can be implemented by assigning an identifiable index to all MU-MIMO spatial streams transmitted to a plurality of STAs and by allowing the VHT-SIGB field 370 to be transmitted through a spatial stream having a first index value of a spatial stream used for each STA or having a specific index value.

If at least one or more spatial streams through which the data field 380 is currently being transmitted in a pre-coded virtual spatial domain are called an available sub-space, the VHT-SIGB field 370 may be transmitted by selecting a specific spatial stream which is a specific sub-space of the available sub-space. However, in this case, the sub-space may not an optimal sub-space for transmission. In addition, when transmission is performed by selecting only one specific sub-space from the available plurality of sub-spaces, if transmissible maximum power exists in that sub-space, maximum possible performance may not be acquired. This is because the maximum transmissible transmission power is not fully utilized in the transmitting end.

On the other hand, in a case where there is no restriction on the maximum transmissible power in each sub-space, if the VHT-SIGB field 370 is transmitted through only one sub-space among the plurality of sub-spaces through which data is being transmitted, power transmitted through that sub-space may be further used for transmission by the number of sub-spaces not used in the VHT-SIGB field 370. For example, if the data field 380 is transmitted through two spatial streams and the VHT-SIGB field 370 is transmitted through a first spatial stream between the two spatial streams, power of a signal for transmitting the VHT-SIGB field 370 may be increased two times. In this case, a spatial stream not used in transmission of the VHT-SIGB field 370 may be transmitting by inserting NULL. This implies that there is no signal transmitted by using a second spatial stream in the above example.

In a case where the VHT-SIGB field 370 is transmitted through a one specific spatial stream among a plurality of spatial streams used for data field transmission, transmission efficiency of the VHT-SIGB field 370 may not be optimized even if signal power increases. This is because the transmission efficiency of the VHT-SIGB field 370 may be determined by performance of the spatial stream itself. To solve this problem, a method of transmitting the VHT-SIGB field 370 by using all spatial streams through which the data field 380 is transmitted is proposed. This may be implemented by using a method of transmitting the VHT-SIGB field 370 by additionally applying a different precoding vector for the VHT-SIGB field 370 and the data field 380 transmitted to a virtual spatial stream domain. Hereinafter, an embodiment of the present invention will be described in greater detail with reference to the accompanying drawings.

Figure 5:
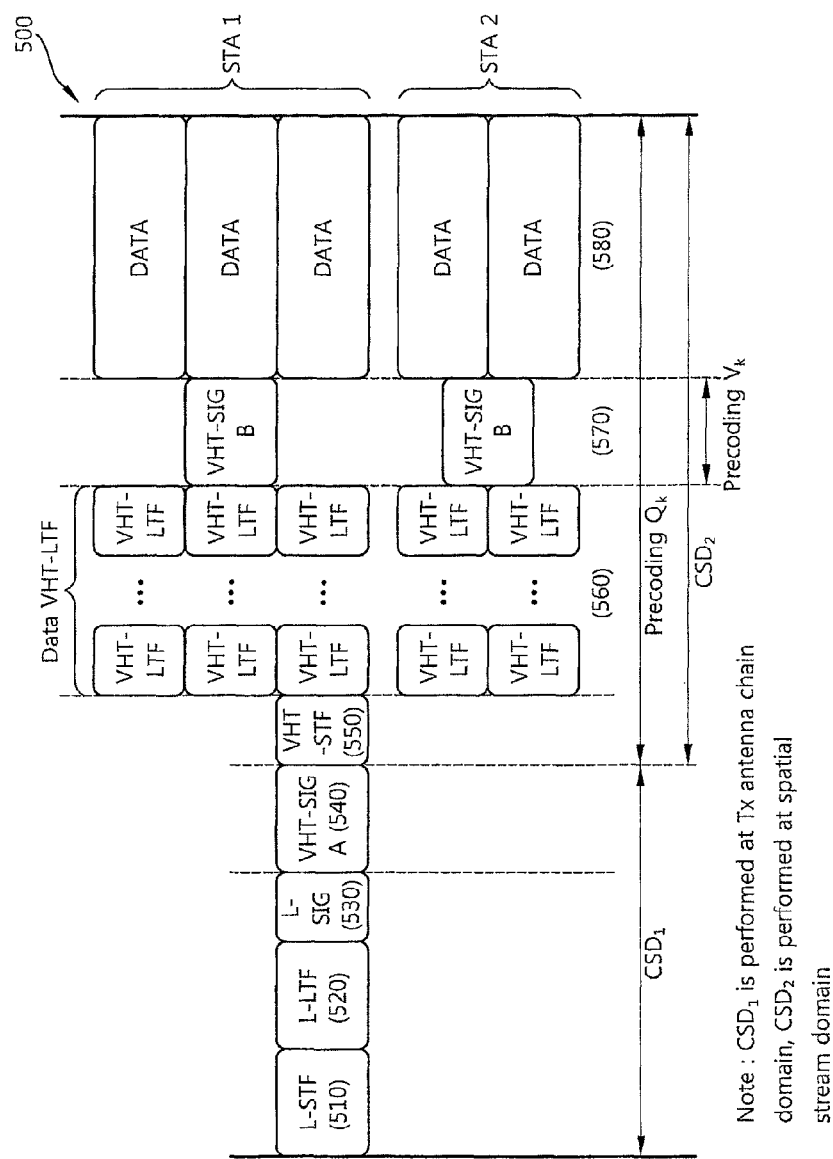
FIG. 5 is a diagram showing a PPDU frame format according to an embodiment of the present invention.

FIG. 5 is a diagram showing a PPDU frame format according to an embodiment of the present invention.

Referring to FIG. 5, a PPDU 500 includes an L-STF field 510, an L-LTF field 520, an L-SIG field 530, a VHT-SIGA field 540, a VHT-STF field 550, a VHT-LTF field 560, a VHT-SIGB field 570, and a data field 580. The fields included in the PPDU 500 have the same meaning and usage as those explained above, and thus details descriptions thereof will be omitted.

When $N_{SS}$ denotes the number of spatial streams used for transmission of the data field to a specific STA, the VHT-SIGB field 570 may be mapped to a plurality of spatial streams by applying a precoding vector having a size of $N_{SS} \times 1$ to control information corresponding to one spatial stream.

A spatial stream through which the VHT-SIGB field 570 and the data field 580 are transmitted corresponds to a sub-space domain virtualized primarily by a precoding matrix Qk. Therefore, when a precoding vector $V_k$ is secondarily applied for transmission of the VHT-SIGB field 570, it corresponds to re-virtualization of a domain which has already been virtualized by the precoding matrix $Q_k$. Since a sub-space through which the VHT-SIGB field 570 is transmissible is identical to a sub-space through which the data field 580 is transmitted, when the precoding vector $V_k$ is applied, it implies that a signal is transmitted by using only some of all sub-spaces. Therefore, there is a need for a method of acquiring spatial diversity while applying the precoding vector $V_k$.

In the present invention, in order to perform transmission with the spatial diversity by applying the precoding vector $V_k$, the random vector $V_k$ pre-agreed between a transmitting end and a receiving end can be applied for each frequency sub-carrier. A method of alternately using a column vector of a discrete Fourier transform (DFT) matrix is proposed so that the vector $V_k$ that changes in a frequency axis is transmitted across all sub-spaces to be spanned. This will be described by reference to Equation 3 and Equation 4 below.

$$M_{DFT} = \begin{bmatrix} 1 & 1 & \cdots & 1 \\ 1 & e^{-j\frac{2\pi}{N}1} & \cdots & e^{-j\frac{2\pi}{N}(N-1)} \\ \vdots & \vdots & e^{-j\frac{2\pi}{N}(n-1)(m-1)} & \vdots \\ 1 & e^{-j\frac{2\pi}{N}(N-1)} & \cdots & e^{-j\frac{2\pi}{N}(N-1)(N-1)} \end{bmatrix} \quad \text{[Equation 3]}$$

$$v_k = \left\{ \begin{bmatrix} 1 \\ 1 \\ 1 \end{bmatrix}, \begin{bmatrix} 1 \\ e^{-j\frac{2\pi}{3}} \\ e^{-j\frac{4\pi}{3}} \end{bmatrix}, \begin{bmatrix} 1 \\ e^{-j\frac{4\pi}{3}} \\ e^{-j\frac{8\pi}{3}} \end{bmatrix} \right\}$$ [Equation 4]

Equation 3 above expresses a normal DFT matrix, and Equation 4 above expresses the precoding vector $V_k$ when the number of spatial streams received by a specific STA is 3. The precoding vector $V_k$ expressed in Equation 4 above is repeated every three frequency subcarriers. Therefore, if the VHT-SIGB field 570 spans three subcarriers, transmission is performed by alternating all sub-spaces through which the data field 580 is transmitted, and in this manner, spatial diversity can be acquired.

Meanwhile, when a column vector included in a specific unitary matrix is alternately used as the precoding vector $V_k$ to be applied to the VHT-SIGB field 570 as described above, if the total number of frequency subcarriers is indivisible by the number of column vectors of the specific unitary matrix, some of the all sub-spaces through which the VHT-SIGB field 570 is transmitted may be transmitted more than other sub-spaces. Therefore, as a method of evenly transmitting the all sub-spaces through which the VHT-SIGB field 570 is transmissible to the maximum extent possible, additional cyclic delay diversity may be applied.

In order to apply the additional cyclic delay diversity in the transmission of the VHT-SIGB field 570, a phase shift per frequency subcarrier may be performed for each vector element. For this, to perform the phase shift per frequency subcarrier, multiplication may be performed while increasing an absolute value of power of an exponential function with a base of a natural constant. For example, if $N_F$ denotes the total number of frequency subcarriers, when spatial streams that must be received by a specific STA are indexed from 0, a value acquired by performing a phase shift to be applied to a spatial stream having a (k−1)th index value can be expressed by $$e^{-j\frac{2\pi}{N_F}(k-1)n}.$$

Herein, n is a cyclic delay value, and more specifically, may be 1 or 2. It can be expressed in a normal vector form as shown in Equation 5 below.

$$v_{cd} = \begin{bmatrix} 1 \\ e^{-j\frac{2\pi}{N_F}k \cdot n} \\ \vdots \\ e^{-j\frac{2\pi}{N_F}k \cdot (N_{SS}-1)n} \end{bmatrix}$$ [Equation 5]

Herein, $N_{SS}$ denotes the total number of spatial streams required for transmission of the VHT-SIGB 570 and the data field 580, k denotes an index value of a frequency subcarrier, $N_F$ denotes the total number of all frequency subcarriers, and n denotes a cyclic delay value.

Figure 6:
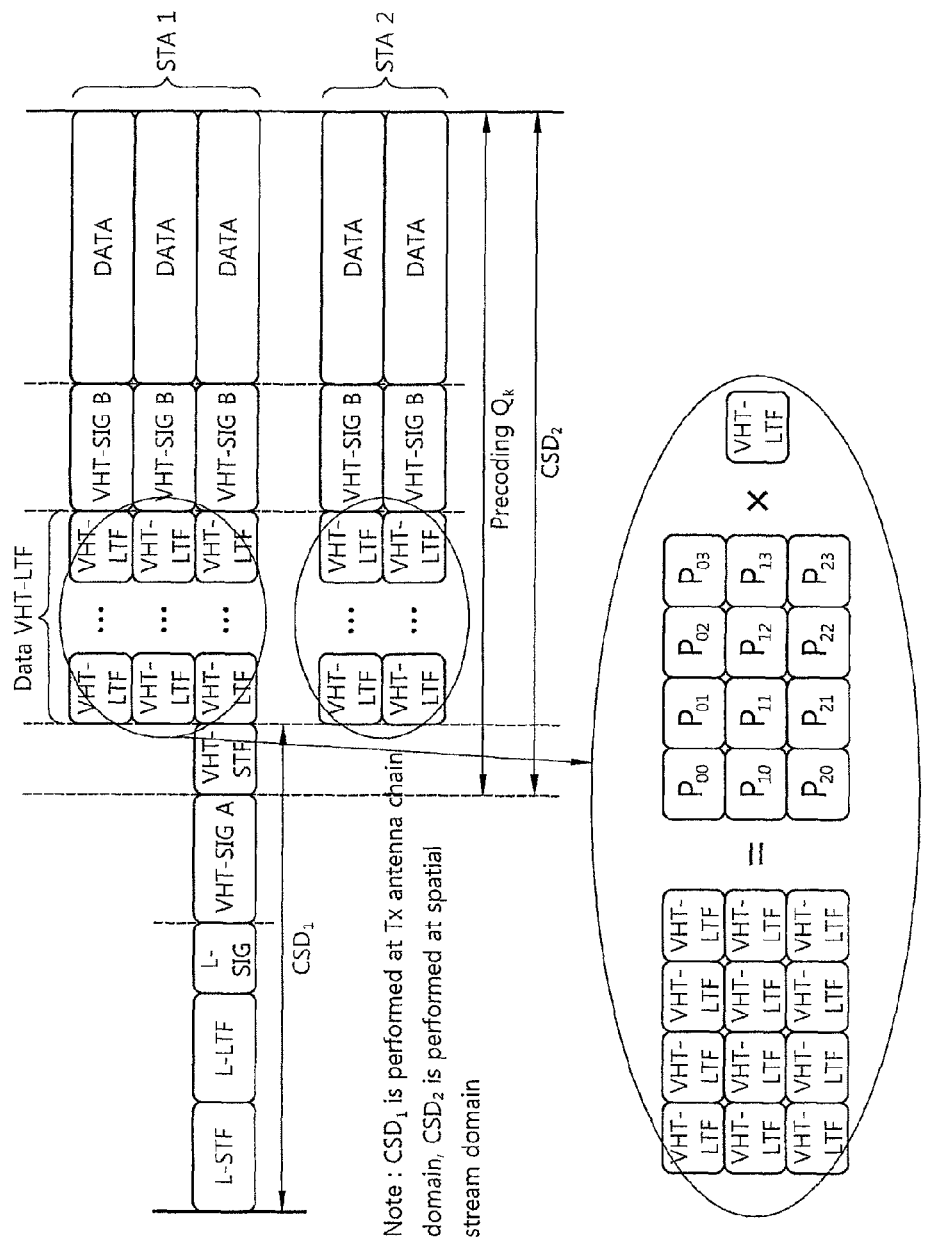
FIG. 6 and FIG. 7 show examples of a PPDU format according to an embodiment of the present invention.
Figure 7:
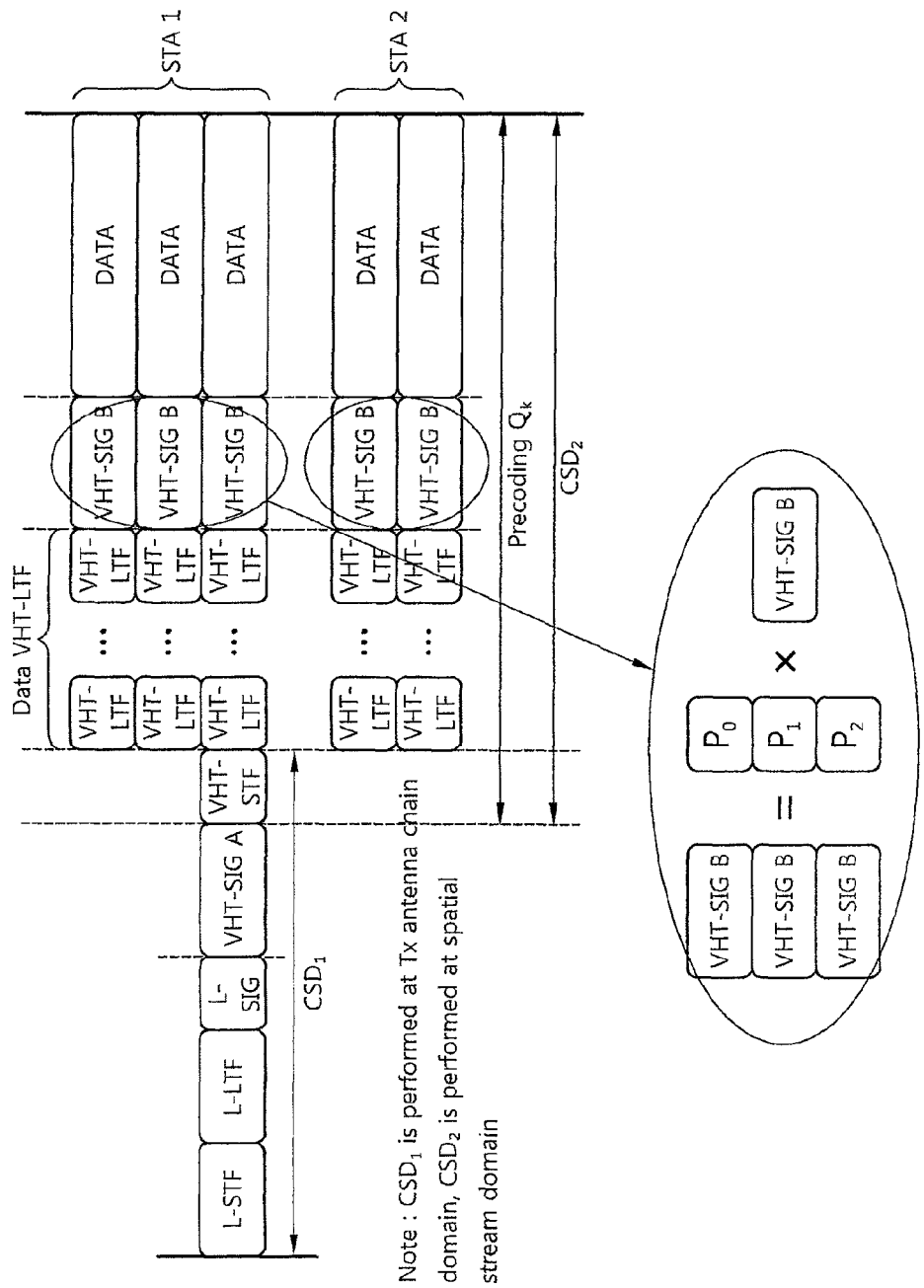

A PPDU format based on the transmission method according to the aforementioned embodiment of the present invention can be expressed by FIG. 6 and FIG. 7.

FIG. 6 and FIG. 7 show examples of the PPDU format according to the embodiment of the present invention.

Regarding the PPDU format, a VHT LTF field is expressed in detail in FIG. 6, and a VHT-SIGB field is expressed in detail in FIG. 7.

Referring to FIG. 6, the VHT LIT is transmitted by multiplying an orthogonal transform matrix to perform channel estimation for each spatial stream. In the orthogonal transform matrix, the number of columns may be determined by the number of OFDM symbols used for transmission of the VHT-LTF, and the number of rows may be determined by the number of spatial streams allocated to a specific STA which is MU-MIMO paired. In FIG. 6, a VHT-LTF to be transmitted to an STA 1 is transmitted by using 4 OFDM symbols through 3 spatial streams, and thus the orthogonal transform matrix may be a 3×4 matrix.

Referring to FIG. 7, it is enough for the VHT-SIGB field to be normally transmitted to a specific STA. The VHT-SIGB field may be transmitted by multiplying a specific transform vector since spatial multiplexing to a plurality of spatial streams is not necessary. The specific transform vector may be the aforementioned additional precoding vector $V_k$, or may be a precoding vector to which a cyclic delay vector is additionally applied. The number of rows of the transform vector may be determined by the number of spatial streams allocated to the specific STA which is MU-MIMO paired. In FIG. 7, the VHT-SIGB field to be transmitted to the STA 1 does not have to be subjected to spatial multiplexing using 3 spatial streams, and thus may be a 3×1 vector matrix.

Figure 8:
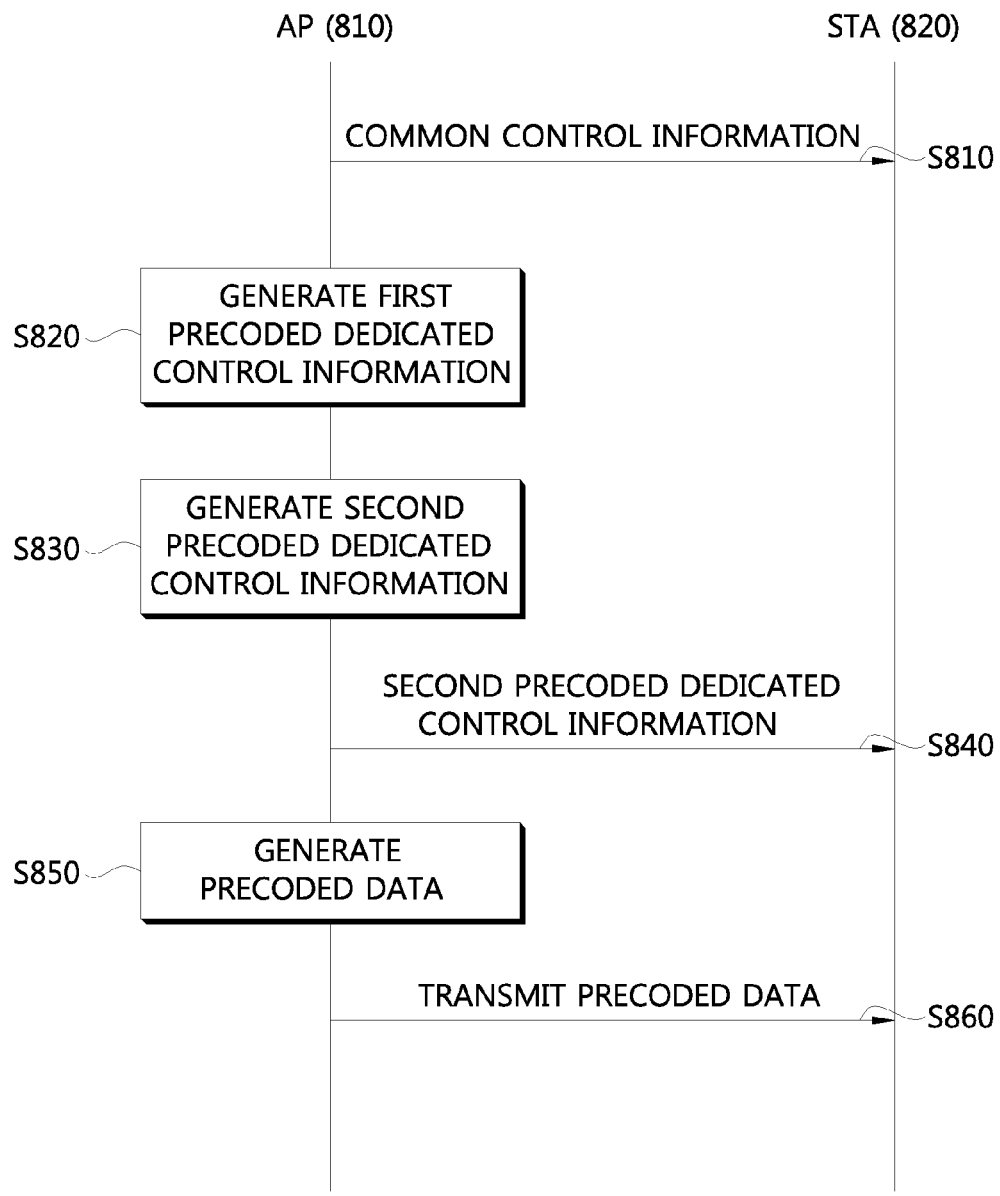
FIG. 8 is a flowchart showing a method of transmitting a PPDU according to an embodiment of the present invention.

FIG. 8 is a flowchart showing a method of transmitting a PPDU according to an embodiment of the present invention.

Referring to FIG. 8, an access point (AP) 810 transmits common control information to an STA 820 (S810). The common control information may be transmitted by being included in a VHT-SIGA field of the PPDU.

The AP 810 performs precoding on dedicated control information to be transmitted to the STA 820 by using a first precoding matrix to generate first precoded dedicated control information (S820). A first precoding matrix is a matrix for precoding data to be transmitted to the STA 820 by using a MIMO scheme. The generation of the first preceded dedicated control information can be implemented by performing precoding on a VHT-SIGA field including the dedicated control information by the use of the first precoding matrix.

The AP 810 performs precoding on the first preceded dedicated control information by using a second precoding matrix to generate second precoded dedicated control information (S830). The generation of the second precoded dedicated control information can be implemented by performing precoding on a first precoded VHT-SIGA field by using a second precoding matrix.

The AP 810 transmits the second precoded dedicated control information to the STA 820 (S840).

The AP 810 generates precoded data by using the first precoding matrix (S850).

The AP 810 transmits the precoded data to the STA 820 (S860).

If common control information, more specifically, a group identifier (ID) included in the common control information, indicates MU-MIMO transmission, the STA decodes the second precoded dedicated control information and thereafter interprets precoded data. If the group ID included in the common control information indicates single user (SU) transmission, the second precoded dedicated control information may not be decoded.

Referring back to FIG. 5, since the VHT WLAN system supports MU-MIMO transmission, the VHT-SIGB fields 570 to be transmitted to a plurality of different STAs are transmitted respectively to a plurality of different STAs. In this case, the VHT-SIGB field 570 transmitted to each STA paired to the AP may be generated in similar cases. The VHT-SIGB field 570 includes a tail bit, a frame length, and an MCS value for different STAs. When the AP provides a service to many STAs that wait to receive the service, there may be a case where a possibility of providing the same-length frame is high, the tail bit is similar since it is always 0, and several bits of the MCS value are different. In this case, similar bits are encoded, and thus spatial interference may occur in which the VHT-SIGB field 570 transmitted for a specific STA has an effect on another VHT-SIGB field transmitted for another STA. As a result, an unnecessary field may be detected rather than detecting a necessary VHT-SIGB field.

To solve such as problem, the VHT-SIGB field transmitted to each of paired STAs may be subjected to bit scrambling. The bit scrambling may be performed before or after encoding the VHT-SIGB field.

Hereinafter, a scrambling method applicable to the present invention will be described. A scrambling code used for scrambling may be generated in various manners, and applicable examples will be described hereinafter.

First, the scrambling code may be generated based on an association ID (AID) which is a unique ID of each STA. The AP allocates the AID to each STA within a BSS. Each STA is identifiable by the AID since there is no possibility that the AID overlaps in the BSS. Therefore, when the scrambling code is generated by using the AID as a scrambling initiator, a different scrambling code may be allocated to each STA.

Second, the scrambling code may be generated based on a group index for MU-MIMO transmission. The present embodiment proposes to use an $N_{STS}$ field included in the VHT-SIGA field as one index. It is assumed that a set of scrambling codes is pre-defined. This will be described in greater detail with reference to the accompanying drawing.

Figure 9:
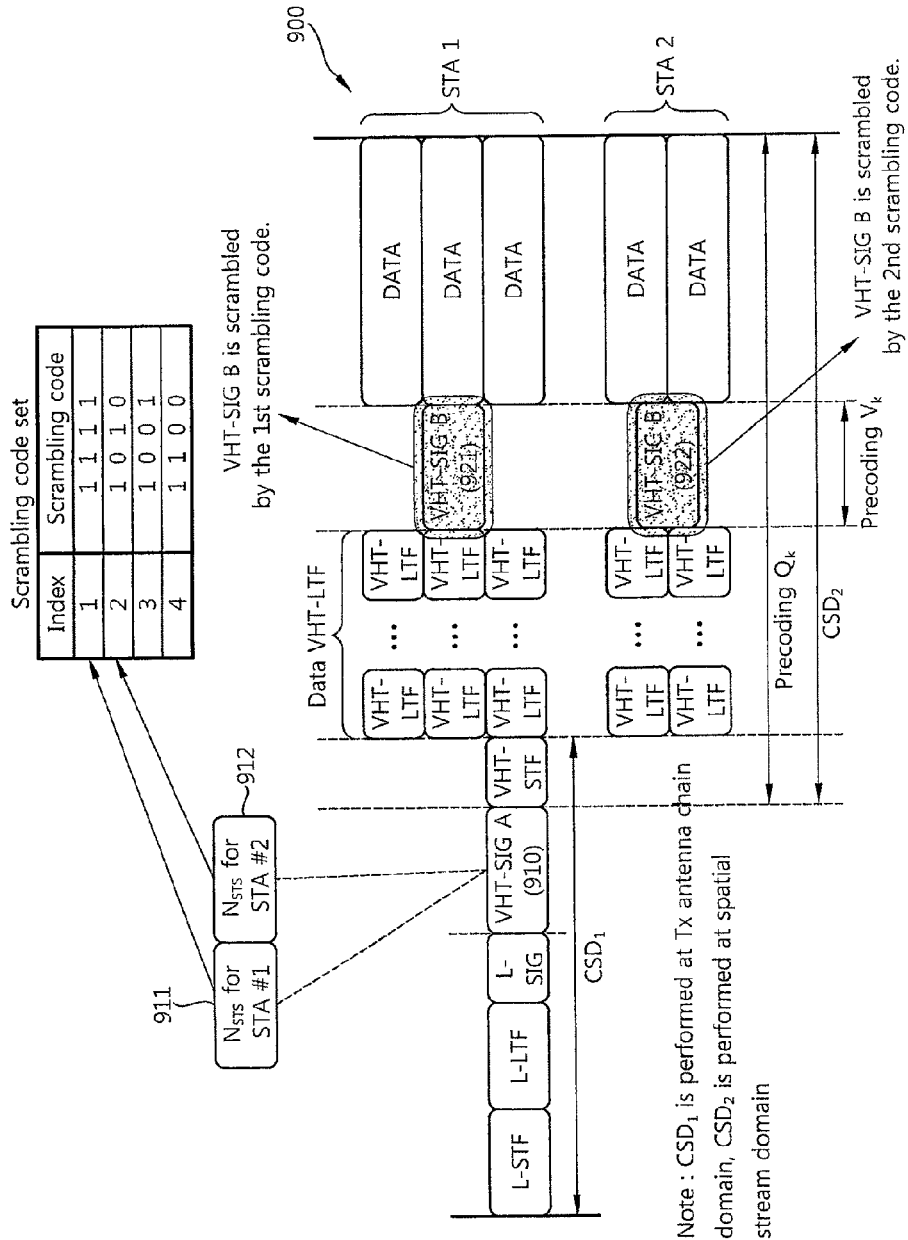
FIG. 9 shows an example of bit scrambling applicable to an embodiment of the present invention.

FIG. 9 shows an example of bit scrambling applicable to an embodiment of the present invention.

Referring to FIG. 9, a PPDU 900 is transmitted to an STA 1 and an STA 2 by using a MU-MIMO scheme. The PPDU 900 includes a VHT-SIGA field 910 for the STA 1 and the STA 2. The VHT-SIGA field 910 includes an $N_{STS}$ subfield 911 for the STA 1 and an $N_{STS}$ subfield 912 for the STA 2. The $N_{STS}$ subfields 911 and 912 are fields for indicating the number or position of space-time streams allocated to each STA. The number of $N_{STS}$ subfields 911 and 912 to be included may be equal to the number of STAs which are MU-MIMO paired to an AP. In FIG. 9, the number of The $N_{STS}$ subfields 911 and 912 that can be included in the VHT-SIGA field 910 may be two for the STA 1 and the STA 2. Therefore, the $N_{STS}$ subfields 911 and 912 may be used as indicators for identifying the MU-MIMO paired STAs.

Index values are assigned to the $N_{STS}$ subfields 911 and 912 in the VHT-SIGA field 910. Each index value may match to a unique scrambling code. The scrambling code may correspond to information known to the AP and all STAs which are MU-MIMO paired to the AP.

In the generation of the PPDU 900, when the VHT-SIGB field 920 is scrambled, the AP may select a scrambling code based on positions of the $N_{STS}$ subfields 911 and 912 included in the VHT-SIGA field 910. In the figure, the $N_{STS}$ subfield 911 for the STA 1 is located at a first position in the VHT-SIGA field 910 and a value '1' is assigned as an index value. Therefore, '1 1 1 1' is selected as a scrambling code to be applied to the VHT-SIGB field 921 to be transmitted to the STA 1. Likewise, the $N_{STS}$ subfield 912 for the STA 2 is located in a second position in the VHT-SIGA field 910, and a value '2' is assigned as an index value. Therefore, '1 0 1 0' may be selected as a scrambling code to be applied to the VHT-SIGB field 922 to be transmitted to the STA 2. The AP scrambles each of the VHT-SIGB fields 911 and 912 by using a corresponding scrambling code.

The MU-MIMO paired STA receives the PPDU 900, and confirms the positions of the $N_{STS}$ subfields 911 and 912 for the STA within the VHT-SIGA field 910. The STA confirms an index value by using the positions of the $N_{STS}$ subfields 911 and 912 and thus can know scrambling codes applied to the VHT-SIGB fields 921 and 922. Therefore, the STA can descramble the VHT-SIGB fields 921 and 922 for the STA.

Although there are four types of scrambling codes each of which has a size of 4 bits in the example of FIG. 9, the number of types of scrambling codes may be less than or greater than 4.

Third, a pseudo noise (PN) sequence may be used as a scrambling code. The AP transmits a PPDU by applying the PN sequence to a VHT-SIGB field. In addition, the PN sequence used herein may be reported to each STA. Although '10110111000' is used as the PN sequence in the WLAN standard, this is for exemplary purposes only, and thus another sequence may be defined and used. In addition, if there is a plurality of PN sequences, each of different PN sequences may be applied as a scrambling code.

Figure 10:
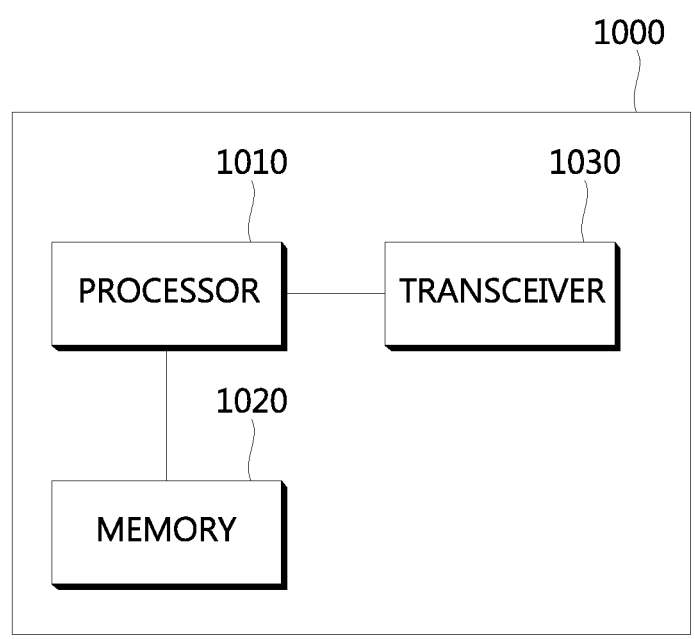
FIG. 10 is a block diagram showing a wireless apparatus to which an embodiment of the present invention is applicable.

FIG. 10 is a block diagram showing a wireless apparatus to which an embodiment of the present invention is applicable. A wireless apparatus 1000 may be an AP or an STA.

Referring to FIG. 10, the wireless apparatus 1000 includes a processor 1010, a memory 1020, and a transceiver 1030. The transceiver 1030 transmits and/or receives a radio signal, and implements an IEEE 802.11 physical layer. The processor 1010 is operationally coupled to the transceiver 1030, and implements a physical layer for implementing the embodiment of the present invention shown in FIG. 3 to FIG. 9 in order to transmit a PPDU.

The processor 1010 and/or the transceiver 1030 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1020 and may be performed by the processor 1010. The memory 1020 may be located inside or outside the processor 1010, and may be coupled to the processor 1010 by using various well-known means.

What is claimed is:

1. A method for transmitting data in a wireless local area network, the method comprising:

transmitting, by a transmitter, a very high throughput (VHT)-SIG-A field in first subcarriers over first orthogonal frequency division multiplexing (OFDM) symbols to a receiver;

transmitting, by the transmitter, a VHT-SIG-B field in second subcarriers over a single second OFDM symbol to the receiver; and transmitting, by the transmitter, a data field in third subcarriers to the receiver, wherein the VHT-SIG-A field, the VHT-SIG-B field and the data field are sequentially transmitted, wherein a number of the second subcarriers is greater than a number of the first subcarriers, and wherein the VHT-SIG-B field is applied by a single column vector and the precoding matrix, the data field is applied by the precoding matrix, and the VHT-SIG-A field is not applied by any of the single column vector and the precoding matrix.

2. The method of claim 1, wherein the number of the first subcarriers is 48.

3. The method of claim 1, wherein a number of the first OFDM symbols is two.

4. The method of claim 1, wherein the VHT-SIG-A field includes information indicating a number of the at least one spatial stream used for transmitting the VHT-SIG-B field and the data field.

5. The method of claim 4, wherein the single column vector is determined based on the number of the at least one spatial stream.

6. A device for a wireless local area network, the device comprising:
- a transceiver configured to transmit and receive radio signals; and
- a processor operatively coupled to the transceiver and configured to:
  - instruct the transceiver to transmit a very high throughput (VHT)-SIG-A field in first subcarrier over first orthogonal frequency division multiplexing (OFDM) symbols to a receiver;
  - instruct the transceiver to transmit a VHT-SIG-B field in second subcarriers over a single second OFDM symbol to the receiver; and
  - instruct the transceiver to transmit a data field in third subcarriers to the receiver,
- wherein the VHT-SIG-A field, the VHT-SIG-B field and the data field are sequentially transmitted,
- wherein a number of the second subcarriers is greater than a number of the first subcarriers, and
- wherein
  - the VHT-SIG-B field is applied by a single column vector and the precoding matrix,
  - the data field is applied by the precoding matrix, and
  - the VHT-SIG-A field is not applied by any of the single column vector and the precoding matrix.

7. The device of claim 6, wherein the number of the first subcarriers is 48.

8. The device of claim 6, wherein a number of the first OFDM symbols is two.

9. The device of claim 6, wherein the VHT-SIG-A field includes information indicating a number of the at least one spatial stream used for transmitting the VHT-SIG-B field and the data field.

10. The device of claim 9, wherein the single column vector is determined based on the number of the at least one spatial stream.

11. A method for receiving data in a wireless local area network, the method comprising:
- receiving, by a receiver, a very high throughput (VHT)-SIG-A field in first subcarrier over first orthogonal frequency division multiplexing (OFDM) symbols from a transmitter;
- receiving, by the receiver, a VHT-SIG-B field in second subcarriers over a single second OFDM symbol from the transmitter; and
- receiving, by the receiver, a data field in third subcarriers from the transmitter,
- wherein the VHT-SIG-A field, the VHT-SIG-B field and the data field are sequentially received,
- wherein a number of the second subcarriers is greater than a number of the first subcarriers, and
- wherein
  - the VHT-SIG-B field is applied by a single column vector and the precoding matrix,
  - the data field is applied by the precoding matrix, and
  - the VHT-SIG-A field is not applied by any of the single column vector and the precoding matrix.

12. A device for a wireless local area network, the device comprising:
- a transceiver configured to transmit and receive radio signals; and
- a processor operatively coupled to the transceiver and configured to:
  - instruct the transceiver to receive a very high throughput (VHT)-SIG-A field in first subcarrier over first orthogonal frequency division multiplexing (OFDM) symbols from a transmitter;
  - instruct the transceiver to receive a VHT-SIG-B field in second subcarriers over a single second OFDM symbol from the transmitter; and
  - instruct the transceiver to receive a data field in third subcarriers from the transmitter,
- wherein the VHT-SIG-A field, the VHT-SIG-B field and the data field are sequentially received,
- wherein a number of the second subcarriers is greater than a number of the first subcarriers, and
- wherein
  - the VHT-SIG-B field is applied by a single column vector and the precoding matrix,
  - the data field is applied by the precoding matrix, and
  - the VHT-SIG-A field is not applied by any of the single column vector and the precoding matrix.

* * * * *